(12) United States Patent
Burke

(10) Patent No.: US 11,774,932 B2
(45) Date of Patent: Oct. 3, 2023

(54) SYSTEMS AND METHODS FOR MANAGING THE CHARGE AND DISCHARGE OF ENERGY FROM CONTROLLABLE DEVICES

(71) Applicant: Virtual Peaker, Inc., Louisville, KY (US)

(72) Inventor: William J. Burke, Louisville, KY (US)

(73) Assignee: Virtual Peaker, Inc., Louisville, KY (US)

( * ) Notice: Subject to any disclaimer, the term of this patent is extended or adjusted under 35 U.S.C. 154(b) by 0 days.

(21) Appl. No.: 16/397,564

(22) Filed: Apr. 29, 2019

(65) Prior Publication Data

US 2019/0339657 A1    Nov. 7, 2019

Related U.S. Application Data

(60) Provisional application No. 62/665,839, filed on May 2, 2018.

(51) Int. Cl.
| | | |
|---|---|---|
| *G05B 19/042* | (2006.01) | |
| *G06Q 30/02* | (2023.01) | |
| *G06Q 50/06* | (2012.01) | |
| *G06Q 30/0201* | (2023.01) | |

(52) U.S. Cl.
CPC ....... *G05B 19/042* (2013.01); *G06Q 30/0206* (2013.01); *G06Q 50/06* (2013.01); *G05B 2219/2639* (2013.01)

(58) Field of Classification Search
CPC .......... G05B 19/042; G05B 2219/2639; G06Q 50/06; G06Q 30/0206
See application file for complete search history.

(56) References Cited

U.S. PATENT DOCUMENTS

| | | | | |
|---|---|---|---|---|
| 2008/0114499 A1* | 5/2008 | Hakim | ...................... | H02J 3/32 700/291 |
| 2010/0292855 A1* | 11/2010 | Kintner-Meyer | ....... | B60L 53/64 700/291 |
| 2012/0150709 A1* | 6/2012 | Kaji | ...................... | G06Q 40/00 705/35 |
| 2014/0129040 A1* | 5/2014 | Emadi | .................... | G06Q 50/06 700/291 |
| 2014/0279361 A1* | 9/2014 | Streeter | .................. | G06Q 50/06 705/37 |
| 2015/0112751 A1* | 4/2015 | Spooren | ........... | G06Q 10/06315 705/7.25 |
| 2016/0226250 A1* | 8/2016 | Fukubayashi | ......... | H02J 7/0063 |
| 2016/0232458 A1* | 8/2016 | Naito | ...................... | H02J 7/007 |
| 2018/0090943 A1* | 3/2018 | Wu | ........................ | H02J 7/0068 |
| 2020/0309860 A1* | 10/2020 | Arima | .................. | H01M 10/48 |

* cited by examiner

*Primary Examiner* — Christopher E. Everett
*Assistant Examiner* — Tameem D Siddiquee
(74) *Attorney, Agent, or Firm* — Dinsmore & Shohl LLP

(57) ABSTRACT

A method for managing energy in a controllable device includes determining a plurality of future energy prices, where each of the future energy prices represents a price of a unit of energy over a predetermined time period, determining a duration to charge a controllable device, correlating the duration to charge the controllable device with at least one predetermined time period based at least in part on the price per unit energy over the at least one predetermined time period, and directing a utility to charge the controllable device at the at least one predetermined time period.

12 Claims, 4 Drawing Sheets

| | |
|---|---|
| TUESDAY 12:00 PM - 1:00 PM | $45 |
| TUESDAY 1:00 PM - 2:00 PM | $40 |
| TUESDAY 2:00 PM - 3:00 PM | $25 |
| TUESDAY 3:00 PM - 4:00 PM | $10 |
| TUESDAY 4:00 PM - 5:00 PM | $3 |
| TUESDAY 5:00 PM - 6:00 PM | $1 |
| TUESDAY 6:00 PM - 7:00 PM | $50 |

FIG. 2

| | |
|---|---|
| BATTERY | 2 HR DISCHARGE, 1 HR CHARGE |
| WATER HEATER | 4 HR DISCHARGE, 1.5 HR CHARGE |
| HVAC | 1.5 HR DISCHARGE, 0.5 HR CHARGE |

FIG. 3

SYSTEMS AND METHODS FOR MANAGING THE CHARGE AND DISCHARGE OF ENERGY FROM CONTROLLABLE DEVICES

CROSS-REFERENCE TO RELATED APPLICATION

This non-provisional patent application claims the benefit under 35 U.S.C. § 119(e) of U.S. Provisional Patent Application Ser. No. 62/665,839, entitled SYSTEMS AND METHODS FOR PROVIDING DEVICE ENERGY MANAGEMENT, and filed May 2, 2018, the entire disclosure of which is hereby incorporated by reference herein.

TECHNICAL FIELD

Embodiments described herein generally relate to systems and methods for providing device energy management and, more specifically, to embodiments for determining desirable times to transact energy.

BACKGROUND

Generally speaking, the cost of energy can vary rapidly. In some environments, the price of energy can change instantaneously and/or at set time increments. As such, energy purchasers and sellers often simply buy and sell energy at the time of purchase. While this system may work well for quickly trading energy, this is not the most effective mechanism for cost efficiency.

SUMMARY

In one embodiment, a method for managing energy in a controllable device includes determining a plurality of future energy prices, where each of the future energy prices represents a price of a unit of energy over a predetermined time period, determining a duration to charge a controllable device, correlating the duration to charge the controllable device with at least one predetermined time period based at least in part on the price per unit energy over the at least one predetermined time period, and directing a utility to charge the controllable device at the at least one predetermined time period.

In another embodiment, a system for device energy management includes a controllable device structurally configured to store and discharge energy, a remote computing device communicatively coupled to the controllable device, the remote computing device including a processor and a computer readable and executable instruction set, which, when executed, causes the processor to determine a plurality of future energy prices, where each of the future energy prices represents a price of a unit of energy over a predetermined time period, determine a duration to charge the controllable device, correlate the duration to charge the controllable device with at least one predetermined time period based at least in part on the price per unit energy over the at least one predetermined time period, and direct a utility to charge the controllable device at the at least one predetermined time period.

In yet another embodiment, a method for managing energy in a controllable device includes determining a plurality of future energy prices, where each of the future energy prices represents a price of a unit of energy over a predetermined time period, calculating a current charge capacity of a controllable device, determining a future charge demand for the controllable device, determining a duration to charge the controllable device based at least in part on the calculated current charge capacity and the determined future charge demand of the controllable device, calculating a current discharge capacity of the controllable device, determining a future discharge demand for the controllable device, determining a duration to discharge the controllable device based at least in part on the calculated current discharge capacity and the determined future discharge demand of the controllable device, correlating the duration to charge the controllable device with a first at least one predetermined time period based at least in part on the price per unit energy over the first at least one predetermined time period, determining a charge strike price based at least in part on the price per unit energy over the first at least one predetermined time period, correlating the duration to discharge the controllable device with a second at least one predetermined time period based at least in part on the price per unit energy over the second at least one predetermined time period, determining a discharge strike price based at least in part on the price per unit energy over the second at least one predetermined time period, directing a utility to charge the controllable device at the first at least one predetermined time period, and directing the controllable device to discharge at the second at least one predetermined time period.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which:

FIG. 2 depicts a day ahead pricing chart, according to embodiments described herein;

FIG. 3 depicts a charge and discharge chart of a plurality of controllable devices, according to embodiments described herein;

DETAILED DESCRIPTION

Embodiments disclosed herein include systems and methods for providing device energy management. In electrical grid operations, it is common to utilize markets to determine the wholesale price of electricity and/or other energy. The markets are typically run by regional transmission organizations (RTOs), such as CAISO in California and ISO-NE in New England. The RTOs have many different market products, and the price of each is determined based on bids from the market participants.

The energy market usually has two key features, a day ahead price (or other future price) and a real-time price. The day ahead price is typically published as a set of twenty-four hourly prices for a single day, and is released approximately six hours before the start of that day. The real-time price is (as the name implies) published in real-time based on current market conditions. Although market variations exist, a typical real-time price is published every five minutes and the price covers the next five minutes.

The wholesale price of electricity varies widely over the course of the day, but the rates that electric utilities offer do not directly include these price variations. The utilities construct end-use rates that consider this variation but are much simpler to understand. Regardless of the simplified end-use rates, the utilities are still subject to the wholesale price fluctuations. As such, embodiments described herein store low-priced energy and discharge the energy during high price periods. Utilizing energy storage, these embodiments provide arbitrage on the cost of energy and save the utility on the wholesale cost of energy. The systems and methods for providing device energy management, incorporating the same will be described in more detail, below.

Figure 1:
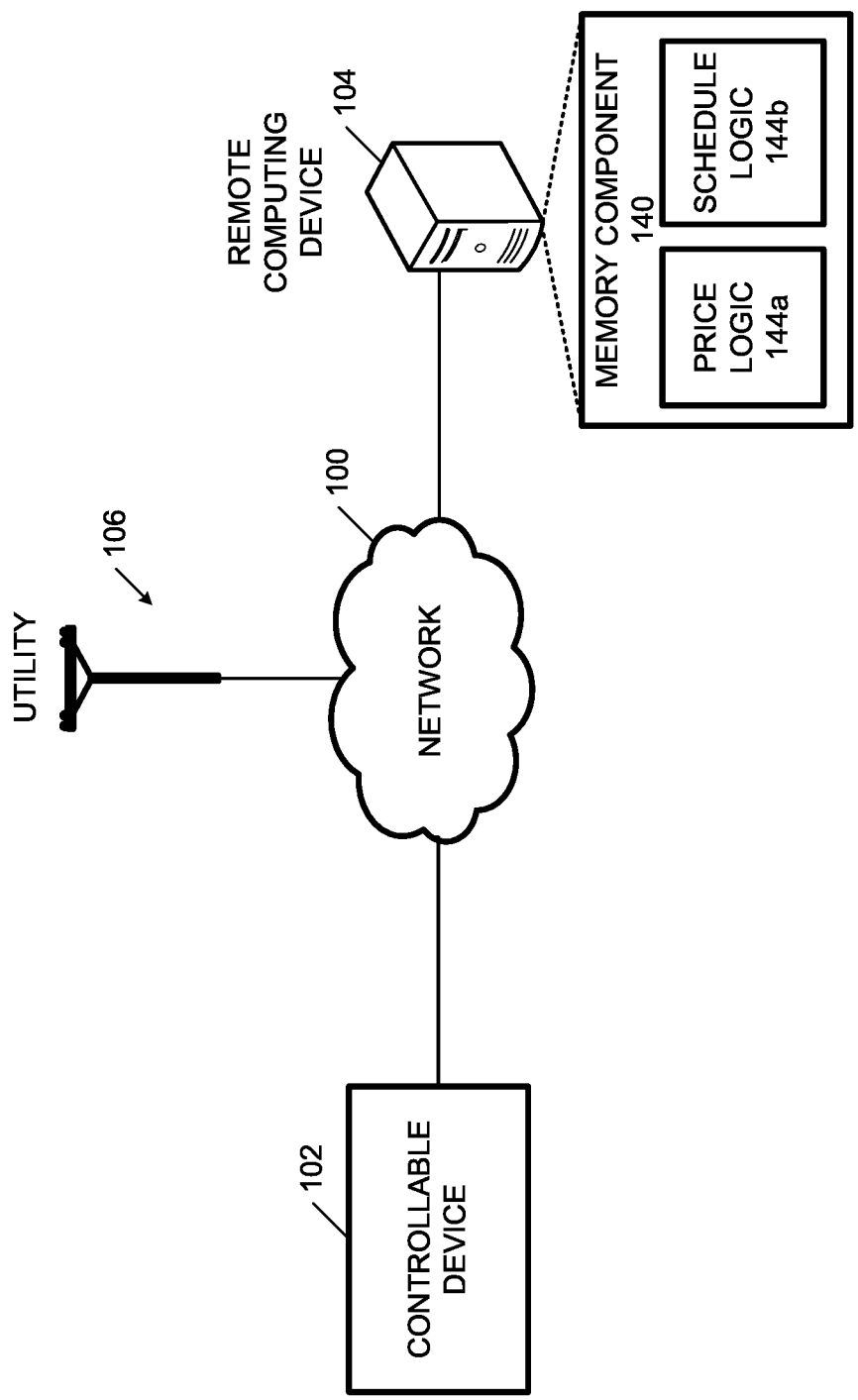
FIG. 1 depicts a computing environment for providing device energy management, according to embodiments described herein.

Referring now to the drawings, FIG. 1 depicts a computing environment for providing device energy management, according to embodiments described herein. As illustrated, the network 100 may be coupled to a controllable device 102, a computing device 104, and a utility 106. The network 100 may include an energy network (such as an electric network, natural gas network, oil network, etc.), any wide area network (such as the internet, a public switched telephone network, a cellular network, etc.), any local area network (such as an Ethernet network, a wireless fidelity network, etc.) and/or any network for facilitating device-to-device communications (such as Bluetooth, near field communications, etc.). The network 100 may communicatively couple the controllable device 102, the computing device 104, and the utility 106 and/or may communicate energy among these devices.

The controllable device 102 may be any device that is structurally configured to store and discharge energy. In embodiments, the controllable device 102 is communicatively coupled to and can communicate with the computing device 104. The controllable device 102 may include, for example, a battery, a water heater, an electric vehicle, a thermostat (and/or other HVAC component), etc. As an example, batteries may be directly charged and can directly discharge electrical energy. In particular, batteries may receive and be charged with electrical energy, such as from an electrical utility 106, and may discharge that electrical energy.

Water heaters can be thought of as thermal storage devices. Water heaters "charge" when using energy to heat water in the insulated tank. Water heaters discharge energy when the hot water is removed from the tank and replaced with cold water from the inlet.

In some examples, water heaters are thermostatic devices that utilize a set point. When the water temperature drops too far below (usually 15 F or 20 F) the set point, the water heater activates its heater. When the water temperature rises to the set point, the heater is turned off. A typical electric resistance heater utilized with a water heater has a maximum demand of 4000 W, and this accordingly is the maximum charge rate. However, energy stored in a water heater is not generally directly discharged in the same manner as a battery, and is instead "indirectly" discharged through the use of the heated water and the replacement of the heated water in the water heater with cold or ambient temperature water. Since a water heater cannot be directly discharged, the maximum discharge rate is 0 W.

The energy capacity of the water heater may additionally be calculated. The energy capacity calculation may consider a minimum usable temperature based on the set point temperature of the water heater. As previously stated, the user can expect 15 F or 20 F difference in water temperature based on the thermostatic control. Therefore, a minimum usable tank temperature may be 20 F below the set point. Given the specific heat associated with water, the energy capacity of the tank may be calculated as: $(T-T_{min})*C*M$, where $T_{min}$ is the minimum usable tank temperature, T is the set point temperature of the tank, and C is the specific heat of water, and M is the mass of water held within the tank.

Electric vehicles (EVs) can also be considered energy storage devices that store electrical energy in the battery of the electrical vehicle. The battery or batteries of EVs can be charged and discharge electrical energy providing the EV with mobility, for example by providing electrical energy to a motor of the EV.

Thermostats and other HVAC components can also be thought of controlling a thermal storage device, such as a building. The air and solid mass inside the building stores energy, and the HVAC system utilizes electrical energy to "charge" the storage device Like the water heater described above, thermostats and other HVAC components may be configured to apply energy (e.g., either heating or cooling) to air within a building upon detecting that a temperature of the air within the building is greater than (in the case of cooling) or is less than (in the case of heating), a set point temperature. In an analogous manner to the water heater example described above, the energy capacity of a building may be expressed as a function of the set point temperature or temperatures of the building, the mass of air and solid mass inside the building, and the specific heat of the air and solid mass inside the building.

Also provided is the computing device 104. The computing device 104 may be configured as any computing device, such as a personal computer, laptop, tablet, server, etc. The computing device 104 may include a memory component 140, which stores price logic 144a and schedule logic 144b. The price logic 144a may be configured to cause the computing device 104 to determine a price of energy, such a daily average price, a real-time price, etc. The schedule logic 144b may cause the computing device 104 to determine a charge and/or discharge schedule of the controllable device for increasing and/or maximizing cost efficiency of the energy.

As described above, the utility 106 may include any provider of energy and need not be a municipality-based utility. Depending on the embodiment, the utility 106 may include a computing device and/or otherwise may communicate the price data and/or other data with the computing device 104.

It should be understood that while the computing device 104 may be physically remote from the controllable device 102, this is merely one embodiment. Some embodiments may be configured such that the controllable device 102 includes an integrated computing device for providing the functionality of the computing device 104 as described herein.

FIG. 2 depicts a day ahead pricing chart, according to embodiments described herein. As illustrated, the day ahead pricing chart may be provided to the computing device 104. The day ahead pricing chart may provide information regarding projected energy prices, for example, a price per unit of energy. The prices may be provided in one hour increments, and/or in other increments. This information may be provided one day in advance, but some embodiments may be provided more than or less than one day in advance, depending on the particular embodiment. It should be understood that while one estimator is the day ahead price, it is possible to obtain more accurate estimates.

FIG. 3 depicts a charge and discharge chart of a plurality of controllable devices 102, according to embodiments described herein. In addition to the day ahead pricing provided in FIG. 2, the table of FIG. 3 provides the controllable devices 102 that may be controlled via the computing device 104. As such, embodiments may be configured to charge and/or discharge any of the devices in FIG. 3, as described herein. Also illustrated in the chart of FIG. 3 are charge and/or discharge durations for each of the controllable devices 102 listed therein. The duration of time to charge each of the controllable devices 102 may be calculated based on the current charge capacity of the controllable device 102 (e.g., an amount of energy to charge the controllable device 102 to its maximum energy capacity based on its current state of charge), and a future charge demand on the controllable device 102. In some embodiments, the duration to charge a controllable device 102 is generally the current charge capacity of the controllable device 102 divided by the future charge demand on the controllable device 102. Similarly, the duration to discharge each of the controllable devices 102 may be calculated based on the current discharge capacity of the controllable device 102 (e.g., amount of energy that can be discharged from the controllable device 102 based on its current state of charge), and a future discharge demand on the controllable device 102. In some embodiments, the duration to discharge a controllable device 102 is generally the current discharge capacity of the controllable device divided by the future discharge demand on the controllable device 102.

Figure 4:
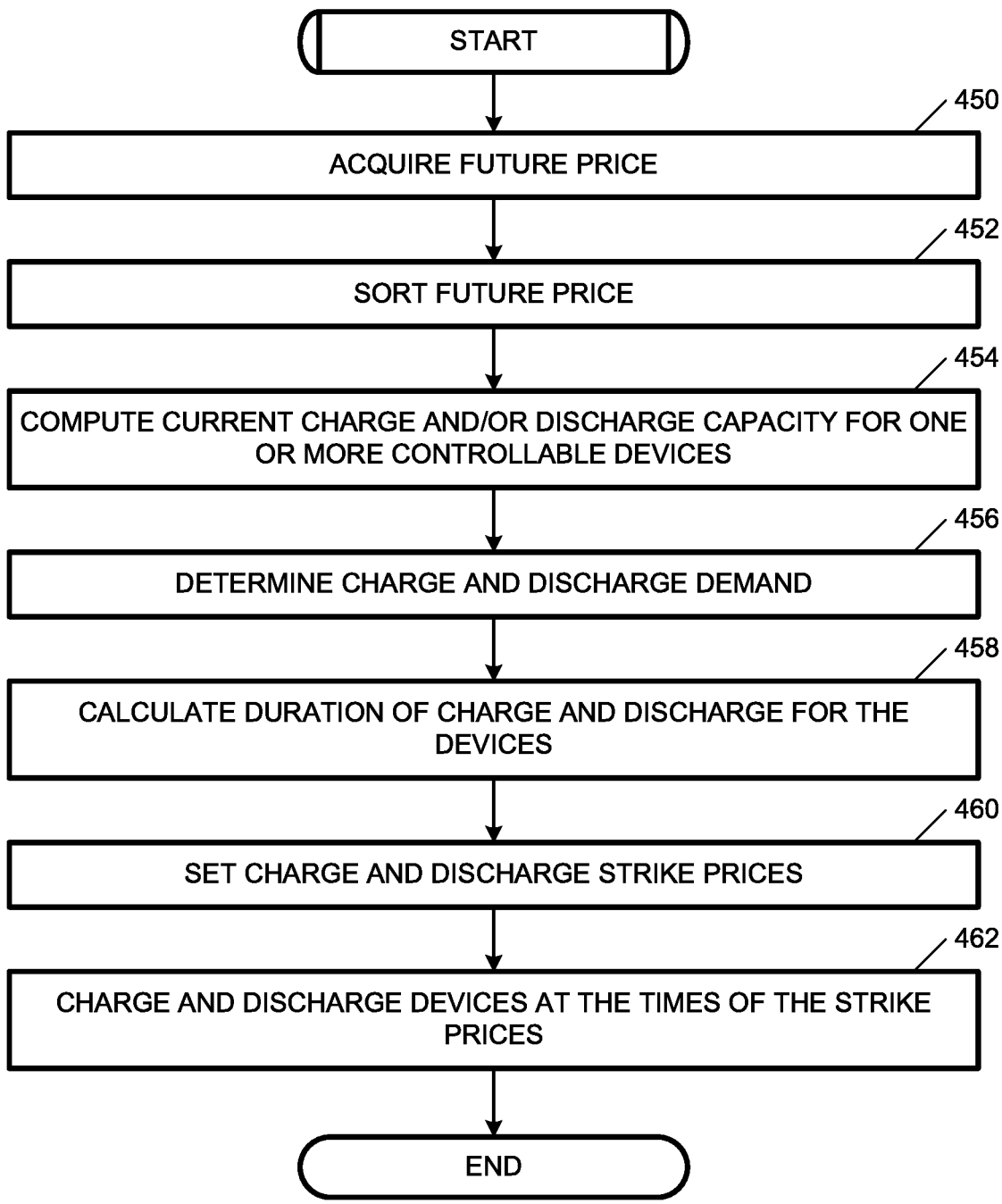
FIG. 4 depicts a flowchart for providing device energy management, according to embodiments described herein.

FIG. 4 depicts a flowchart for providing device energy management, according to embodiments described herein. Embodiments provided herein include an algorithm that can be computed at the individual device level or the system level given appropriate aggregations. In the embodiments described herein, the blocks depicted in FIG. 4 may be performed by the computing device 102 depicted in FIG. 1.

As illustrated in block 450, embodiments described herein may determine a plurality of future energy prices, such as a day ahead price. In embodiments, each of the future energy prices represent a price of a unit energy over a predetermined time period. In the example shown in FIG. 2, each of the future energy prices span an hour on a given day. In block 452, the future price may be sorted by price, such as from most expensive to least expensive. In block 454, the current charge and/or discharge capacity may be calculated for one or more controllable devices 102. In block 456, a charge and/or discharge demand may be determined. In block 458, a duration to charge and/or discharge the controllable device 102 may be determined.

In block 460, charge and discharge strike prices may be determined. The charge strike price may be determined by correlating the duration to charge the controllable device 102 with at least one predetermined time period based at least in part on the price per unit energy over the at least one predetermined time period. The discharge strike price may be determined by correlating the duration to discharge the controllable device 102 with at least one predetermined time period based at least in part on the price per unit energy over the at least one predetermined time period.

For example, the discharge strike price may be determined by walking down the ordered estimates from the highest price until the discharge time is less than the sum of the duration of the crossed price blocks. The charge strike price may be determined by walking up the ordered estimates from the lowest price until the charge time is less than the sum of the duration of the crossed price blocks. Further, the strike price could be determined by interpolating between two future price estimates, if appropriate given the computed charge/discharge durations. In block 462, the controllable devices 102 may be charged and/or discharged at the times of the strike prices. For example, to charge the controllable devices 102 at the time of the charge strike price, the utility 106 (FIG. 1) may be directed to charge the controllable devices 102 at the time of the charge strike price. To discharge the controllable devices 102 at the time of the discharge strike price, the controllable devices 102 may be simply directed to discharge at the time of the discharge strike price.

As an example and referring to FIGS. 2 and 3, the discharge duration of a controllable device 102 (e.g., the battery) may be determined to be 2.0 hours and the charge duration may be determined to be 1.0 hours. The sorted price estimates for the price estimates depicted in FIG. 2 in descending order of price is $50 (Tuesday 6 PM-7 PM), $45 (Tuesday 12 PM-1 PM), $40, (Tuesday 1 PM-2 PM), $25 (Tuesday 2 PM-3 PM), $10 (Tuesday 3 PM-4 PM), $3 (Tuesday 4 PM-5 PM), and $1 (Tuesday 5 PM-6 PM).

In this example, the discharge strike price is $40 (e.g., the discharge duration of 2 hours taken through the two hours of the highest price estimates). The charge strike price in this example is $1 (e.g., the charge duration of 1 hour taken through the hour of the lowest price estimate).

The controllable device 102 may be directed, such as via the computing device 104, to charge and discharge energy at the times of the strike prices. For example, in the example above, the controllable device 102 may be directed to discharge Tuesday 6 PM-7 PM, and Tuesday 12 PM-1 PM (e.g., the two hours of the highest price estimates), and may be directed to charge Tuesday 5 PM-6 PM (e.g., the hour of the lowest price estimate). In this way, the controllable device 102 may discharge at times of highest energy costs, and may be charged at times of lowest energy costs, thereby permitting cost efficient use of the controllable device 102 in view of prospective energy costs.

Figure 5:
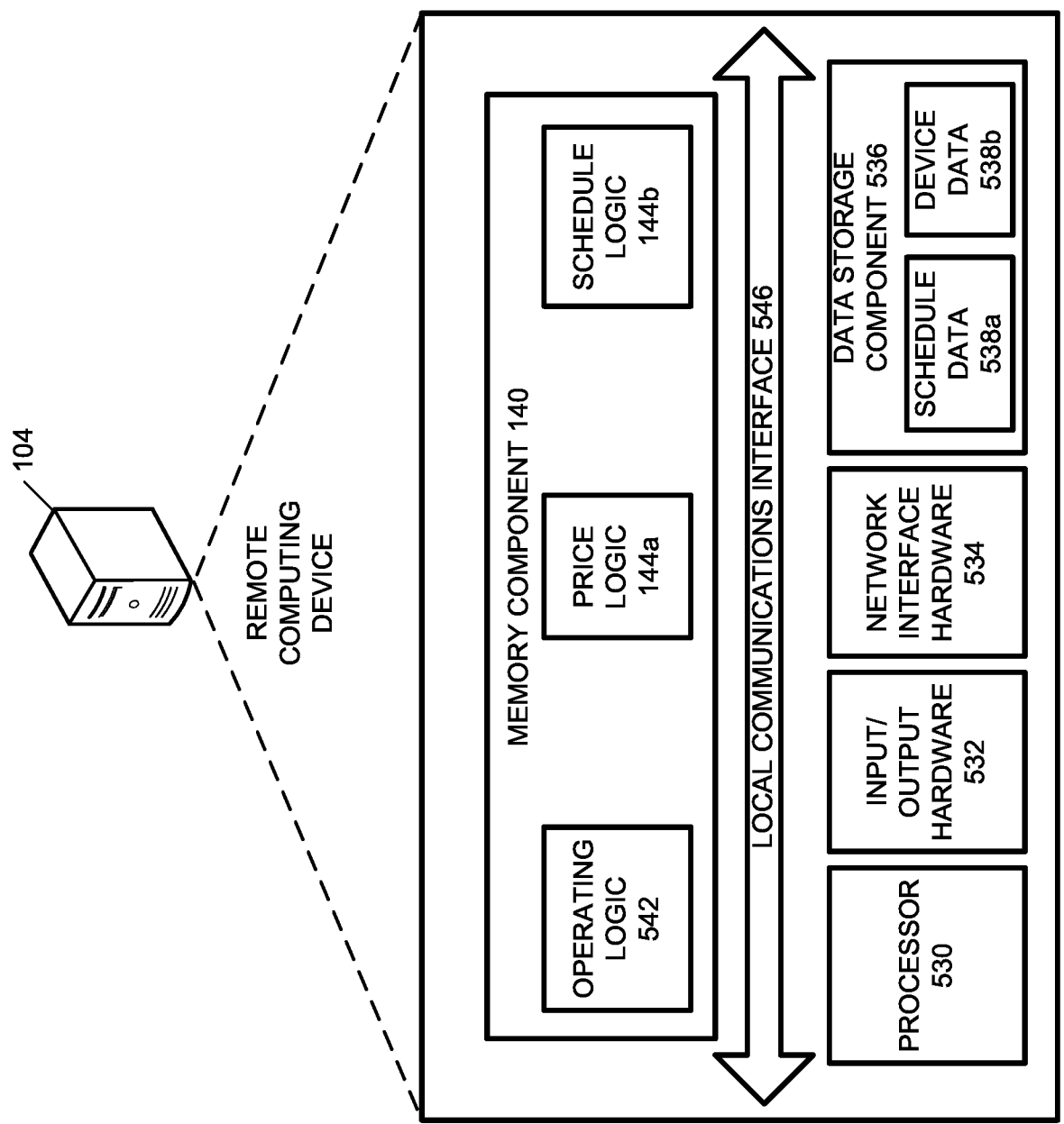
FIG. 5 depicts a computing device for providing device energy management, according to embodiments described herein.

FIG. 5 depicts a computing device 104 for providing device energy management, according to embodiments described herein. As illustrated, the computing device 104 includes a processor 530, input/output hardware 532, the network interface hardware 534, a data storage component 536 (which stores schedule data 538a, device data 538b, and/or other data), and the memory component 140. The memory component 140 may be configured as volatile and/or nonvolatile memory and as such, may include random access memory (including SRAM, DRAM, and/or other types of RAM), flash memory, secure digital (SD) memory, registers, compact discs (CD), digital versatile discs (DVD), and/or other types of non-transitory computer-readable mediums. Depending on the particular embodiment, these non-transitory computer-readable mediums may reside within the computing device 104 and/or external to the computing device 104.

The memory component 140 may store operating logic 542, the price logic 144a, and the schedule logic 144b. The price logic 144a and the schedule logic 144b may each include a plurality of different pieces of logic, each of which may be embodied as a computer program, firmware, and/or hardware, as an example. A local interface 546 is also included in FIG. 5 and may be implemented as a bus or other communication interface to facilitate communication among the components of the computing device 104.

The processor 530 may include any processing component operable to receive and execute instructions (such as from a data storage component 536 and/or the memory component 140). In embodiments, the processor 530 may execute the blocks described above and depicted in FIG. 4 in response to receiving a computer readable and executable instruction set (such as from the data storage component 536 and/or the memory component 140). The input/output hardware 532 may include and/or be configured to interface with microphones, speakers, a display, and/or other hardware.

The network interface hardware 534 may include and/or be configured for communicating with any wired or wireless networking hardware, including an antenna, a modem, LAN port, wireless fidelity (Wi-Fi) card, WiMax card, ZigBee card, Bluetooth chip, USB card, mobile communications hardware, and/or other hardware for communicating with other networks and/or devices. From this connection, communication may be facilitated between the computing device 104 and other computing devices, such as the user computing device 852 and/or computing device 854.

The operating logic 542 may include an operating system and/or other software for managing components of the computing device 104. As also discussed above, price logic 144a and the schedule logic 144b may reside in the memory component 140 and may be configured to perform the functionality, as described herein.

It should be understood that while the components in FIG. 5 are illustrated as residing within the computing device 104, this is merely an example. In some embodiments, one or more of the components may reside external to the computing device 104. It should also be understood that, while the computing device 104 is illustrated as a single device, this is also merely an example. In some embodiments, the price logic 144a and the schedule logic 144b may reside on different computing devices. As an example, one or more of the functionalities and/or components described herein may be provided by the user computing device 852 and/or computing device 854.

Additionally, while the computing device 104 is illustrated with the price logic 144a and the schedule logic 144b as separate logical components, this is also an example. In some embodiments, a single piece of logic (and/or or several linked modules) may cause the computing device 104 to provide the described functionality.

As illustrated above, various embodiments for device energy management are disclosed. These embodiments may provide the ability to efficiently purchase and/or sell energy. Additionally, these embodiments cause ordinary devices, such as water heaters and HVAC systems to also operate as energy storage devices. As such, these embodiments are configured to solve problems inherently present in the computing and networking fields and related to automatic purchase, sale, and delivery of energy, which previous solutions were not able to solve.

While particular embodiments and aspects of the present disclosure have been illustrated and described herein, various other changes and modifications can be made without departing from the spirit and scope of the disclosure. Moreover, although various aspects have been described herein, such aspects need not be utilized in combination. It should also be understood that Attachment A is incorporated by references herein. Accordingly, it is therefore intended that the appended claims cover all such changes and modifications that are within the scope of the embodiments shown and described herein.

It should now be understood that embodiments disclosed herein include systems, methods, and non-transitory computer-readable mediums for device energy management. It should also be understood that these embodiments are merely exemplary and are not intended to limit the scope of this disclosure.

What is claimed is:

1. A method for dynamically providing arbitrage on cost of energy in a controllable device configured to store and discharge energy, the method comprising:
   determining a plurality of future energy prices for more than two time periods, wherein each of the future energy prices represents a price of a unit of energy over a predetermined time period;
   predicting a duration to charge a controllable device;
   determining a current discharge capacity of the controllable device, the current discharge capacity being an amount of energy that can be discharged from the controllable device based on its current state of charge;
   predicting a duration to discharge the controllable device by dividing the current discharge capacity by a future discharge demand on the controllable device;
   correlating the duration to charge the controllable device with at least one predetermined time period based at least in part on the price per unit energy over the at least one predetermined time period;
   correlating the duration to discharge the controllable device with at least two non-sequential predetermined time periods based at least in part on the plurality of future energy prices including the price per unit energy over the at least two non-sequential predetermined time periods, correlating the duration to discharge comprising determining a discharge strike price by:
      sorting the plurality of future energy prices for the more than two time periods in an order from the highest price to the lowest price generating a sorted list of the future energy prices each corresponding to a respective time period;
      walking down the sorted list and stopping at a time period when the discharge duration is less than the sum of the duration of the time periods walked; and
      the future energy price corresponding to the stopped time period being the discharge strike price;
   directing the controllable device to discharge when a current energy price is at or above the discharge strike price; and
   directing a utility to charge the controllable device at the at least one predetermined time period.

2. The method of claim 1, wherein determining the duration to charge the controllable device comprises calculating a current charge capacity of the controllable device, the current charge capacity being an amount of energy to charge the controllable device to its maximum energy capacity based on its current state of charge.

3. The method of claim 2, wherein determining the duration to charge the controllable device further comprises determining a future charge demand.

4. The method of claim 1, wherein correlating the duration to charge comprises determining a charge strike price.

5. A system for dynamically providing arbitrage on a cost of device energy, comprising:
   a controllable device structurally configured to store and discharge energy; and
   a remote computing device communicatively coupled to the controllable device, the remote computing device comprising a processor and a computer readable and executable instruction set, which, when executed, causes the processor to:
      determine a plurality of future energy prices for more than two time periods, wherein each of the future energy prices represents a price of a unit of energy over a predetermined time period;
      predict a duration to charge the controllable device;

determine a current discharge capacity of the controllable device, the current discharge capacity being an amount of energy that can be discharged from the controllable device based on its current state of charge;
predict a duration to discharge the controllable device by dividing the current discharge capacity by a future discharge demand on the controllable device;
correlate the duration to charge the controllable device with at least one predetermined time period based at least in part on the price per unit energy over the at least one predetermined time period;
correlate the duration to discharge the controllable device with at least two non-sequential predetermined time periods based at least in part on the plurality of future energy prices including the price per unit energy over the at least two non-sequential predetermined time periods, correlating the duration to discharge comprising determining a discharge strike price, the discharge strike price being determined by:
sorting the plurality of future energy prices for the more than two time periods in an order from the highest price to the lowest price generating a sorted list of the future energy prices each corresponding to a respective time period;
walking down the sorted price list and stopping at a time period when the discharge duration is less than the sum of the duration of the time periods walked; and
the future energy price corresponding to the stopped time period being the discharge strike price; and
direct a utility to charge the controllable device at the at least one predetermined time period.

6. The system of claim 5, wherein causing the processor to determine the duration to charge the controllable device comprises causing the processor to calculate a current charge capacity of the controllable device, the current charge capacity being an amount of energy to charge the controllable device to its maximum energy capacity based on its current state of charge.

7. The system of claim 6, wherein causing the processor to determine the duration to charge the controllable device further comprises causing the processor to determine a future charge demand.

8. The system of claim 5, wherein causing the processor to correlate the duration to charge comprises determining a charge strike price.

9. The system of claim 5, wherein causing the processor to correlate the duration to charge comprises sorting the plurality of future energy prices by the price of the unit energy and determining a charge strike price.

10. A method for dynamically providing arbitrage on a cost of energy in a controllable device configured to store and discharge energy, the method comprising:
determining in advance a plurality of future energy prices for more than two time periods, wherein each of the future energy prices represents a price of a unit of energy over a predetermined time period;
calculating a current charge capacity of a controllable device, the current charge capacity being an amount of energy to charge the controllable device to its maximum energy capacity based on its current state of charge;
determining a future charge demand for the controllable device;
predicting a duration to charge the controllable device based at least in part on the calculated current charge capacity and the determined future charge demand of the controllable device;
calculating a current discharge capacity of the controllable device, the current discharge capacity being an amount of energy that can be discharged from the controllable device based on its current state of charge;
determining a future discharge demand for the controllable device;
predicting a duration to discharge the controllable device by dividing the current discharge capacity by the future discharge demand on the controllable device;
correlating the duration to charge the controllable device with at least two non-sequential predetermined time periods based at least in part on the plurality of future prices including the price per unit energy over the at least two non-sequential predetermined time periods;
determining a charge strike price based at least in part on the price per unit energy over the at least two non-sequential predetermined time periods;
correlating the duration to discharge the controllable device with a second at least one predetermined time period based at least in part on the price per unit energy over the second at least one predetermined time period;
determining a discharge strike price based at least in part on the price per unit energy over the second at least one predetermined time period;
directing a utility to charge the controllable device at the at least two non-sequential predetermined time periods based on the charge strike price; and
directing the controllable device to discharge at the second at least one predetermined time period,
wherein the charge strike price is determined by:
sorting the plurality of future energy prices for the more than two time periods in an order from the lowest price to the highest price generating a sorted list of the future energy prices each corresponding to a respective time period;
walking up the sorted list and stopping at a time period when the charge duration is less than the sum of the duration of the time periods walked; and
the future energy price corresponding to the stopped time period being the charge strike price.

11. The method of claim 1, wherein the controllable device is a water heater.

12. A system for dynamically providing arbitrage on a cost of energy in a thermal storage device, comprising:
a thermal storage device structurally configured to store and discharge energy; and
a remote computing device communicatively coupled to the thermal storage device, the remote computing device comprising a processor and a computer readable and executable instruction set, which, when executed, causes the processor to:
determine a plurality of future energy prices for more than two time periods, wherein each of the future energy prices represents a price of a unit of energy over a predetermined time period;
determine a current discharge capacity of the thermal storage device, the current discharge capacity being an amount of energy that can be discharged from the thermal storage device based on its current state of charge;
predict a duration to charge the thermal storage device;

predict a duration to discharge the storage device by dividing the current discharge capacity by a future discharge demand on the thermal storage device;

correlate the duration to charge the thermal storage device with at least one predetermined time period based at least in part on the price per unit energy over the at least one predetermined time period;

correlate the duration to discharge the thermal storage device with at least two non-sequential predetermined time periods based at least in part on the plurality of future energy prices including the price per unit energy over the at least two non-sequential predetermined time periods;

correlate the duration to discharge comprising determining a discharge strike price, the discharge strike price being determined by:

sorting the plurality of future energy prices for the more than two time periods in an order from the highest price to the lowest price generating a sorted list of the future energy prices each corresponding to a respective time period;

walking down the sorted price list and stopping at a time period when the discharge duration is less than the sum of the duration of the time periods walked; and the future energy price corresponding to the stopped time period being the discharge strike price;

correlate the duration to charge comprising determining a charge strike price, the charge strike price being determined by:

sorting the plurality of future energy prices for the more than two time periods in an order from the lowest price to the highest price generating a sorted list of the future energy prices each corresponding to a respective time period;

walking up the sorted list and stopping at a time period when the charge duration is less than the sum of the duration of the time periods walked; and the future energy price corresponding to the stopped time period being the charge strike price;

direct the controllable device to discharge when a current energy price is at or above the discharge strike price; and direct the controllable device to charge when the current energy price is at or below the charge strike price.

\* \* \* \* \*